United States Patent [19]

Kattenberg

[11] Patent Number: 4,862,632

[45] Date of Patent: Sep. 5, 1989

[54] FISH HOOK STRUCTURE

[76] Inventor: Robert L. Kattenberg, 12974 Hwy. 24 & 285, Buena Vista, Colo. 81211

[21] Appl. No.: 248,170

[22] Filed: Sep. 23, 1988

[51] Int. Cl.$^4$ .............................................. A01K 83/00
[52] U.S. Cl. .................................... 43/43.16; 43/44.2; 43/44.8; 43/44.83
[58] Field of Search .................. 43/43.16, 44.8, 44.83, 43/44.2

[56] References Cited

U.S. PATENT DOCUMENTS

| 1,093,000 | 4/1914 | Kinsey | 43/44.83 |
| 1,505,235 | 8/1924 | Archer | 43/44.2 |
| 1,533,092 | 4/1925 | Bonbright | 43/44.8 |
| 2,333,503 | 11/1943 | Worden | 43/44.83 |
| 2,995,858 | 8/1961 | Rathmann | 43/44.8 |
| 3,000,131 | 9/1961 | Stinson | 43/44.8 |
| 3,082,563 | 3/1963 | Mason | 43/43.16 |

FOREIGN PATENT DOCUMENTS

| 26904 | of 1902 | United Kingdom | 43/44.8 |
| 2067882 | 8/1981 | United Kingdom | 43/43.16 |

Primary Examiner—Kurt Rowan
Attorney, Agent, or Firm—Phillip A. Rein

[57] ABSTRACT

This invention relates to a fish hook structure utilized by a fisherman on a conventional rod and reel assembly and drawn to the special structures for (1) receiving and holding bait thereon; and (2) increasing the effectiveness of catching a fish member therewith. The fish hook structure is provided with a leader line member secured to a fish hook member by a knot line section. The fish hook member includes a main hook body having a barbed end section integral with one end thereof and a secondary hook section integral with an upper end thereof. The barbed end section resembles the conventional pointed portion of a fish hook member. The secondary hook section extends laterally of the main hook body at an angular relationship and having an outer pointed portion thereof. The secondary hook section is adapted to have the leader line member placed thereagainst and bait, such as a worm member, placed about the fish hook member to entirely enclose same including a portion of the leader line member so as to appear that only the bait member is present. The secondary hook section is operable with the outer portion to achieve improved efficiency in connecting same to a mouth portion of a fish member for catching same.

3 Claims, 1 Drawing Sheet

U.S. Patent   Sep. 5, 1989   4,862,632
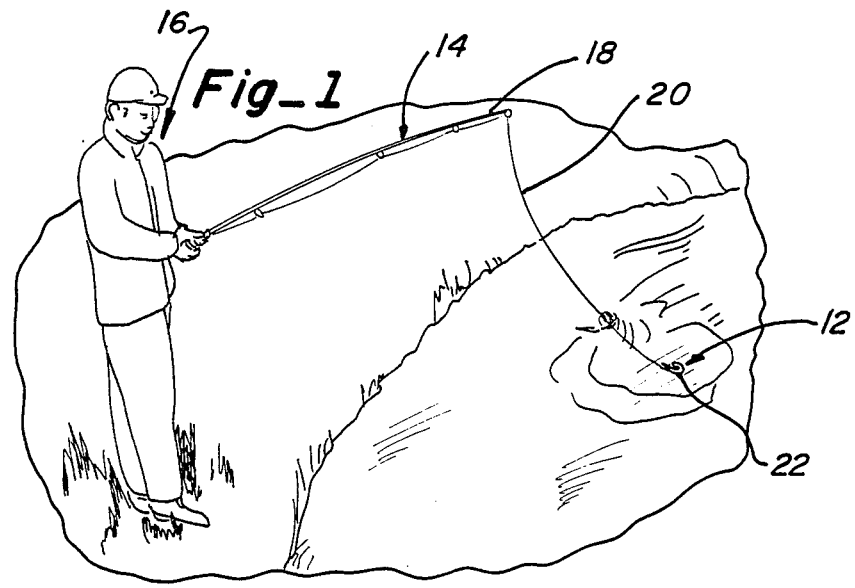
Fig_1
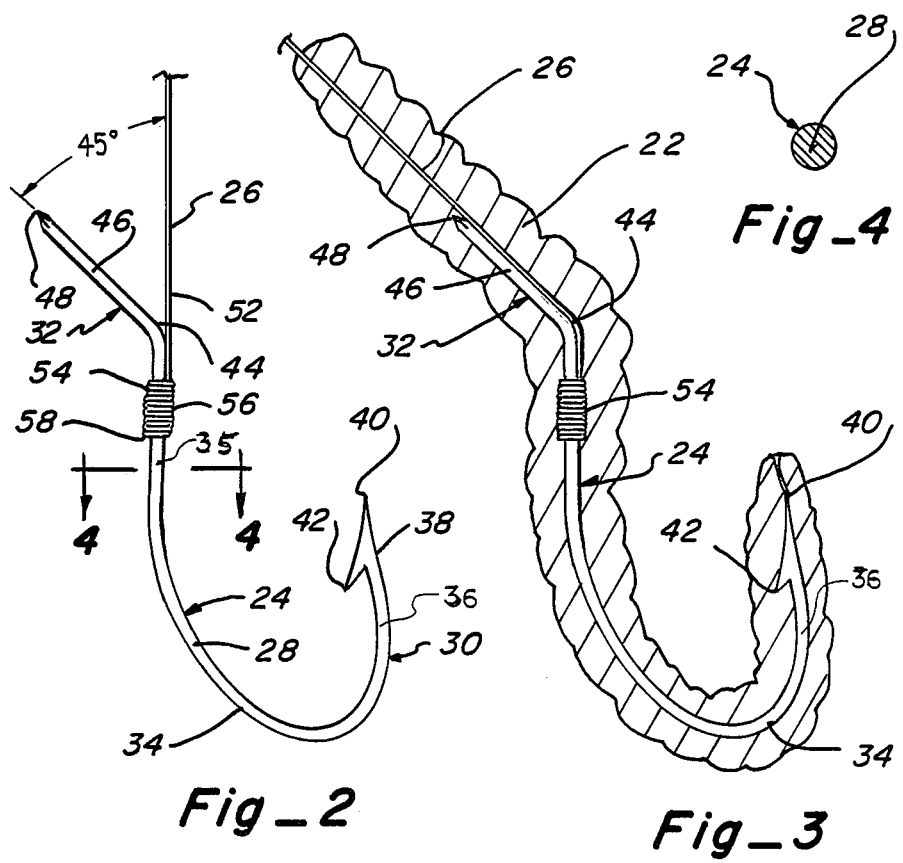
Fig_2   Fig_3   Fig_4

FISH HOOK STRUCTURE

PRIOR ART

A patent search on this invention revealed the following U.S. patents:

| U.S. Pat. No. | Invention | Inventor |
|---|---|---|
| 77,365 | FISH HOOK | Rufus A. Fish |
| 250,825 | WORM HOOK | Lewis Childre |
| 310,118 | FISH HOOK | William C. Bower |
| 690,109 | FISH HOOK | Edwin N. Hubbard |
| 1,457,373 | FISHHOOK | Fritz Kessel |
| 2,225,504 | GUARD FOR FISHHOOKS | Halsey J. Mitchell |
| 2,792,664 | BARBLESS FISHHOOK | Fred Schwarzer |
| 2,990,641 | HOOKS | Floyd C. Weidman |

Numerous of the patents disclose the connection of a leader line to a fish hook without the use of an eyelet as shown by the Weidman patent. The Weidman patent is drawn to a sleeve structure which can be moved downwardly to cover a barbed portion of a fish hook structure for ease of removing from the mouth of a fish.

The Kessel patent discloses a fish hook structure provided with spring arms to protect against entanglement in weed structures.

The Hubbard and Bower patents disclose fish hook structures having a lateral projection which is to aid in preventing the fish from swallowing the entire hook structure.

The Mitchell patent discloses a guard for a fish hook which extends downwardly to prevent the fish from swallowing the entire hook structure.

The Fish patent (appropriate name, issued in 1868) discloses a fish hook structure having a leader line attached at adjustable positions as noted in FIGS. 1 and 3.

The Childre patent discloses a fish hook having a barbed portion integral with opposite ends of a shank portion.

The Schwarzer patent discloses a fish hook having a leader line attached using a cement to anchor same.

Therefore, it is noted that none of the prior art references reveal structures which operate in a similar manner to the applicant's invention.

PREFERRED EMBODIMENT OF THE INVENTION

In one preferred embodiment of this invention, a fish hook structure includes (1) a fish hook member; and (2) a leader line member which is secured to the fish hook member which, in turn, is attached to a fishing line on a rod and reel assembly to be utilized by a fisherman. The fish hook member includes a main hook body having a barbed end section integral with one end thereof and a secondary hook section integral with an opposite upper end of the main hook body. The main hook body is of a generally arcuate shape having an arcuate body section. The barbed end section resembles a conventional fish hook having a curved portion ending at the outer end thereof with a barbed portion with a barb point which is the normal hook portion used to hook a fish member on its' swallowing the subject fish hook structure of this invention. The secondary hook section is provided with an arcuate curved portion and an outer pointed portion. The secondary hook section extends at approximately a 45 degree angle from the main hook body. The leader line member is provided with a connector section and a knot line section coiled about the main hook body adjacent the secondary hook section and secured by a fisherman's knot. The knot line section can be further anchored to the main hook body by the use of a cement material applied thereto. The connector line section of the leader line member is placed against the body portion of the secondary hook section when training bait such as a worm member onto the entire length of the fish hook member and extended upwardly on the leader line member. The secondary hook section is operable (1) for ease of attachment of bait such as a worm member thereon; and (2) the outer pointed portion is operable to engage an inner portion of the mouth of a fish member to achieve beneficial results in that it will act as an additional hook and prevent the discharge of the fish hook structure by the fish member.

OBJECTS OF THE INVENTION

One object of this invention is to provide a new and novel fish hook structure which can be attached to any fishing line on a rod and reel assembly and having means thereon for ease of attaching a fishing bait and aid in securing same in the mouth of a fish once the bait has been swallowed.

One further object of this invention is to provide a new and novel fish hook structure provided with diametrically opposed barb portion and an outer pointed portion to provide a improved efficiency and success in catching fish members by a fisherman.

One other object of this invention is to provide a fish hook structure which permits bait, such as a fishing worm, to be trained about an entire outer periphery the length of the fish hook structure and onto an adjacent connected leader line member so that only the fishing worm is visible except for the leader line member extended from one end thereof.

Still, one further object of this invention is to provide a fish hook structure which is economical to manufacture; substantially maintenance free; easy for attaching the bait thereon; and provided with means for more effectively attaching to a mouth portion of a fish member caught by the fisherman.

Various other objects, advantages, and features of the invention will become apparent to those skilled in the art from the following discussion, taken in conjunction with the accompanying drawings, in which:

FIGURES OF THE INVENTION

FIG. 1 illustrates a fisherman utilizing a rod and reel member with a fishing line connected thereto and having, at the outer end thereof, a fish hook structure of this invention secured thereto;

FIG. 2 is a side elevational view of the fish hook structure of this invention;

FIG. 3 is a view similar to FIG. 2 illustrating bait, such as a worm member, attached to the fish hook structure of this invention; and FIG. 4 is an enlarged sectional view taken along line 4—4 in FIG. 2.

The following is a discussion and description of preferred specific embodiments of the fish hook structure of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings, and in particular to FIG. 1, a fish hook structure of this invention, indicated generally at 12, is shown as attached to a rod and reel assembly 14 being operated by a fisherman 16. The rod and reel assembly 14 includes a fishing pole member 18 having a fishing line 20 connected thereto which, in turn, has the fish hook structure 12 attached to an outer end thereof. The fish hook structure 12 normally has bait, such as a worm member 22, connected thereto when in use.

As noted in FIG. 2, the fish hook structure 12 includes (1) a fish hook member 24; and (2) a leader line member 26 attached to the fish hook member 24. The fish hook member 24 includes a main hook body 28 integral at one end with a barbed end section 30 and integral at an opposite end thereof with a secondary hook section 32.

The main hook body 28 is provided with an arcuate body section 34 integral with an upper straight connector section 35 which, with the barbed end section 30, resembles a major portion of a part of a conventional fish hook member.

The barbed end section 30 is provided with an arcuate curved portion 36 which, in turn, is integral with a barbed portion 38.

The barbed portion 38 includes an end point 40 and a barbed point 42 which operates in a conventional manner to anchor itself within a mouth portion of a fish member.

The secondary hook section 32 is provided with an arcuate curved portion 44 integral with a body portion 46 which, in turn, ends with an outer pointed portion 48. The arcuate curved portion 44 could be positioned at various angles relative to its connection to the arcuate body section 34 but an angle of 45 degrees has been illustrated in FIG. 2 which is the ideal condition. Of course, this angle could vary plus or minus 10 degrees from 45 degrees and improve fishing results over the prior art fish hook structures.

The leader line member 26 can be of a conventional nature having a loop section (not shown) on one outer end thereof and integral with a connector line section 52 which, in turn, is integral with a knot line section 54. The knot line section 54 is provided with a substantial coiled portion 56 which may utilize a special fisherman's knot for securing purposes. Additionally, a cement material 58, which is a solvent similar to nail polish remover, is placed on the coiled portion 56 and acts to cause a slight disolving of the the normal plastic leader line member 26 to achieve a definite locking and secure knot at the connector section 35 so as to secure the fish hook member 24 thereto.

USE AND OPERATION OF THE INVENTION

In the use and operation of the invention, it is noted that the leader line member 26 may have a hoop portion on an outer end of the connector line 52 which can be connected to the fishing line 20 of the rod and reel assembly 14 through a snap, swivel connector or other such structure.

Next, the fisherman 16 can attach bait, such as a fishing worm member 22, to the fish hook structure 12. This can be easily achieved by training the worm member 22 first over the end point 40 of the barbed end section 30 and moved upwardly over the knot line section 54; the secondary hook section 32; and onto the connector line section 52 as illustrated in FIG. 3. This achieves a complete enclosing of the fish hook member 24 as the connector line section 52 would then lay adjacent and longitudinally aligned with the body portion 46 of the secondary hook section 32. This is achieved because, as noted in FIG. 4, the fish hook member 24 is of circular shape in transverse cross sections similar to a conventional fish hook member.

When using the fish hook structure 12 as noted in FIG. 1 by the fisherman 16, a fish member may swallow the worm member 22 in the condition noted in FIG. 3. Next, a pulling of the fish pole member 18 by the fisherman 16 would lodge the barbed end section 30 in a portion of the fish members member's mouth. A normal reaction of the fish member is then to discharge the fish hook structure 12. However, due to a jerking motion of the fisherman 16 on the fish pole member 18, the secondary hook section 32 and, more specifically, the outer pointed portion 48 would contact and lodge in another portion of the fish member's mouth to achieve a firm, definite attachment therefore before the subsequent landing of the fish member by the fisherman 16.

It is noted that the fish hook structure of this invention is substantially simple in structure and operation but has proven new, novel, and beneficial results in the operation of catching a fish member by a fisherman. The fish hook structure is simple in construction; rigidly attached to the leader line member 26; substantially maintenance free; and proven efficient and effective in catching fish members by the use of a rod and reel assembly.

While the invention has been described in conjunction with preferred embodiments thererof, it will be understood that this description is intended to illustrate and not to limit the scope of the invention, which is defined by the following claims:

I claim:

1. A fish hook structure adapted to be connected to an outer end of a fishing line on a rod and reel assembly used by a fisherman to catch a fish member, comprising:
   (a) a fish hook member secured to a leader line member;
   (b) said fish hook member having a main hook body integral at one end with a barbed end section and at an opposite upper end with a secondary hook section connected by a shank
   (c) said secondary hook section extending forwardly from the end of the shank and laterally opposite to the barbed section at approximately a 45 degree angle to the shank of said main hook body and having an outer pointed portion engagable within a mouth portion of the fish member for anchoring thereto; and
   (d) said main hook body and said secondary hook section are extended in a common plane and of circular shape in transverse cross section.

2. A fish hook structure as described in claim 1, wherein:
   (a) said leader line member connected to said main hook body at a portion adjacent said secondary hook section and movable to a position adjacent and aligned with said main hook body;

whereby a bait member such as a worm member is placed about an entire length of said fish hook member, said main hook body, and a portion of said leader line member to completely enclose same.

3. A fish hook structure as described in claim 1, wherein:
 (a) said barbed end section includes an arcuate rear portion integral with an outer barbed portion being operable to attach to a mouth portion of the fish member; and
 (b) said secondary hook section having an arcuate curved portion integral with a body portion which, in turn, is integral with said outer pointed portion all of circular shape in transverse cross section.

* * * * *